(12) United States Patent
Braun et al.

(10) Patent No.: US 6,378,508 B1
(45) Date of Patent: Apr. 30, 2002

(54) PROCESS AND SYSTEM FOR AUTOMATICALLY CONTROLLING THE FRACTION OF THE EXHAUST GAS QUANTITY RETURNED TO AN INTERNAL-COMBUSTION ENGINE

(75) Inventors: Tillmann Braun, Berglen; Uwe Gärtner, Remshalden, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/528,069

(22) Filed: Mar. 17, 2000

(30) Foreign Application Priority Data

Mar. 19, 1999 (DE) .......................... 199 12 317

(51) Int. Cl.$^7$ ............................................. F02M 25/07
(52) U.S. Cl. .............. 123/568.12; 701/108; 123/568.21
(58) Field of Search ................. 123/568.12, 568.11, 123/568.22, 568.31, 672, 568.21, 704; 701/108

(56) References Cited

U.S. PATENT DOCUMENTS

| | | | |
|---|---|---|---|
| 4,060,065 A | 11/1977 | Hata | |
| 4,426,848 A | 1/1984 | Stachowicz | |
| 4,462,376 A | 7/1984 | Ripper | |
| 5,738,126 A | 4/1998 | Fausten | ...................... 123/569 |
| 5,918,582 A | 7/1999 | Itoyama et al. | ............. 123/571 |
| 6,029,451 A | 2/2000 | Gärtner | ...................... 60/605.2 |
| 6,098,602 A | * | 8/2000 | Martin et al. ........... 123/568.23 |

FOREIGN PATENT DOCUMENTS

| | | |
|---|---|---|
| DE | 32 48 745 | 7/1984 |
| DE | 42 38 068 | 5/1993 |
| DE | 43 37 313 | 11/1993 |
| DE | 4337313 C1 * | 3/1995 |
| DE | 196 28 235 | 1/1997 |
| DE | 196 15 545 | 6/1997 |
| DE | 197 34 494 | 10/1998 |
| DE | 197 20 643 | 11/1998 |
| DE | 197 27 793 | 1/1999 |
| EP | 0 574 614 | 12/1993 |
| EP | 0752523 | 1/1997 |
| JP | 58197461 | 11/1983 |

* cited by examiner

*Primary Examiner*—Andrew M. Dolinar
*Assistant Examiner*—Arnold Castro
(74) *Attorney, Agent, or Firm*—Crowell & Moring LLP

(57) ABSTRACT

A process and system are provided for automatically controlling the fraction of the exhaust gas quantity returned to an internal-combustion engine with respect to the mixture quantity fed on the whole to the internal-combustion engine. The mixture quantity is formed by the returned exhaust gas quantity and a fresh air quantity. The actual fraction with respect to the mixture quantity fed on the whole is determined by sensors measuring a plurality of operating parameters selected from the temperature of the fed fresh air quantity, the temperature of the returned exhaust gas quantity, the temperature of the mixture quantity fed as a whole, the temperature of the exhaust gas flowing out of the internal-combustion engine, the flow rate of the fresh air quantity fed to the internal-combustion engine, and the flow rate of the mixture quantity fed on the whole to the internal-combustion engine. This actual fraction of the returned exhaust gas quantity is adapted to a predetermined desired fraction. The returned exhaust gas quantity is automatically controlled to a predetermined content of nitrogen oxides in the exhaust gas.

11 Claims, 3 Drawing Sheets

PROCESS AND SYSTEM FOR AUTOMATICALLY CONTROLLING THE FRACTION OF THE EXHAUST GAS QUANTITY RETURNED TO AN INTERNAL-COMBUSTION ENGINE

BACKGROUND AND SUMMARY OF THE INVENTION

This application claims the priority of German Patent Document 199 12 317.9, filed Mar. 19, 1999, the disclosure of which is expressly incorporated by reference herein.

The invention relates to a process for automatically controlling the fraction of the exhaust gas quantity returned to an internal-combustion engine with respect to the mixture quantity which is fed on the whole to the internal-combustion engine and which is formed by the returned exhaust gas quantity and a fresh air quantity. Furthermore, the invention relates to a system for implementing the process.

Processes of the above-mentioned type are known, for example, from European Patent Document EP 05 74 614 A1, German Patent Document DE 43 37 313 C1 or German Patent document DE 42 38 068 A1.

The returning of exhaust gas, which leaves an internal-combustion engine after the combustion has taken place, and its mixing with the fresh air quantity flowing to the internal-combustion engine is used for lowering the temperature during the combustion operation, whereby the $NO_x$ emissions of the internal-combustion engine can be reduced. In practice, the exhaust gas return is used mainly in the case of diesel internal-combustion engines, but it can also be carried out in the case of Otto internal-combustion engines.

The quantity or the mass of the returned exhaust gas considerably influences the combustion operation taking place in the internal-combustion engine, and the air ratio $\lambda$, the emitted pollutants (essentially $NO_x$) as well as the efficiency of the combustion operation depend on this exhaust gas mass. A mass of returned exhaust gas which is not optimal can therefore result in unacceptably high pollutant emissions or in a steep rise of the fuel consumption. For this reason, it is meaningful to very precisely coordinate the quantity of the returned exhaust gas with each operating point of the internal-combustion engine when designing an internal-combustion engine.

The so-called exhaust gas return rate is used as a measurement for this purpose. This exhaust gas return rate is defined by the quotient of the returned exhaust gas quantity divided by the mixture quantity fed on the whole to the internal-combustion engine. The total mixture quantity returned to the internal-combustion engine is composed of the returned exhaust gas quantity and the fresh air quantity. In a known manner, the returned exhaust gas quantity can in this case be adjusted by so-called exhaust gas return valves which are controlled by the electronic system of the engine.

However, in the case of such exclusively controlled systems, no feedback takes place to the engine timing unit concerning the actually set exhaust gas return rate or the actual fraction of the returned exhaust gas quantity with respect to the total mixture quantity fed to the internal-combustion engine, whereby systematic faults, such as the hysteresis of a valve, a malfunctioning or disturbance affecting the system from the outside cannot be recognized and can therefore not be compensated. A precise adjustment of the returned exhaust gas quantity is therefore not generally ensured. As mentioned above, this results in increased exhaust gas emissions and a rising fuel consumption.

In various solution setups, for example, according to the above-mentioned documents, it was attempted to eliminate these problems by a determination of the actual fraction of the returned exhaust gas quantity and a corresponding automatic control thereof.

In European Patent Document EP 05 74 614 A1, the quantity of the returned exhaust gas is determined using a Venturi nozzle.

German Patent Document DE 43 37 313 C1 suggests a heat accumulator for evening out the exhaust gas temperature as well as a pressure gauge, a temperature measuring device and a control valve downstream of the heat accumulator. By means of these elements, the returned exhaust gas flow rate is to be determined and automatically controlled by a control valve.

In German Patent Document DE 42 38 068 A1, the pressure is measured in the exhaust pipe and the exhaust gas return rate is automatically controlled correspondingly.

If, for example, a commercially available $\lambda$-probe is used as the sensor, it is disadvantageous that, below a minimal measurable temperature of approximately 150° C., the heating capacity of the sensor is not sufficient for reaching the operating temperature required for the measurement, which results in high measuring inaccuracies. Another problem is the measuring inaccuracy of $\lambda$-probes at oxygen concentrations of more than 19%. Particularly at a partial load, in which high oxygen concentrations occur, the determined exhaust gas return rate can therefore not be considered to be reliable. However, if the exhaust gas return rate is not correctly determined, it will not be possible to automatically precisely control it.

In the case of the automatic control by way of the pressure in the exhaust pipe, the pressure difference between the exhaust gas removal and the exhaust gas feeding is not constant, which results in a difficult automatic control. Furthermore, measuring inaccuracies can result, for example, from the contamination of the air filter, which measuring inaccuracies result in an incorrectly set exhaust gas return rate.

It is therefore an object of the present invention to provide a process by means of which the fraction of the exhaust gas quantity returned to an internal-combustion engine with respect to the mixture quantity returned on the whole to the internal-combustion engine can be determined in a very simple manner and, in addition, very precisely and, corresponding to the calculated actual fraction, can be automatically controlled to a predetermined desired fraction.

According to the invention, this object is achieved by providing a process for automatically controlling the fraction of the exhaust gas quantity returned to an internal-combustion engine with respect to the mixture quantity fed on the whole to the internal-combustion engine, which mixture quantity is formed by the returned exhaust gas quantity and a fresh air quantity, wherein the actual fraction of the returned exhaust gas quantity with respect to the mixture quantity fed on the whole to the internal-combustion engine is determined by means of sensors from measurements of the temperature of the fed fresh air quantity, the temperature of the returned exhaust gas quantity and the temperature of the mixture quantity fed on the whole, and wherein this actual fraction of the returned exhaust gas quantity is adapted to a predetermined desired fraction.

As the result of the temperature of the fed fresh air quantity, the temperature of the returned exhaust gas quantity and the temperature of the mixture quantity fed on the whole, the actual fraction of the returned exhaust gas quantity can be determined in a very simple manner according to the formula $AR_{actual}=(T_{L-TG})/(T_L-T_R)$. As the result of a corresponding automatic control, the actual fraction of the returned exhaust gas quantity determined in this manner can then be adapted to a predetermined desired fraction, for example, filed in a characteristic diagram.

A constructive system for implementing the above noted process according to the invention includes an internal-combustion engine, with which at least one fresh air pipe and at least one exhaust pipe are connected, an exhaust gas return valve arranged in an exhaust gas return pipe, a temperature sensor for measuring the temperature of the fed fresh air quantity, a temperature sensor for measuring the temperature of the returned exhaust gas quantity, and a temperature sensor for measuring the temperature of the mixture quantity fed on the whole.

As the result, a very simple arrangement exists in the periphery of an internal-combustion engine, whereby the process according to the invention can be carried out with a high reliability.

An alternative solution of the object of the invention involves a process for automatically controlling the fraction of the exhaust gas quantity returned to an internal-combustion engine with respect to the mixture quantity fed on the whole to the internal-combustion engine, which mixture quantity is formed by the returned exhaust gas quantity and a fresh air quantity, wherein the actual fraction of the returned exhaust gas quantity with respect to the mixture quantity fed on the whole to the internal-combustion engine is determined by means of at least one sensor from at least one measurement of the temperature of the exhaust gas flowing out of the internal-combustion engine, and wherein this actual fraction of the returned exhaust gas quantity is adapted to a predetermined desired fraction, said system comprising:

an internal-combustion engine, with which at least one fresh air pipe and at least one exhaust pipe are connected, an exhaust gas return valve, and at least one temperature sensor for measuring the temperature of the exhaust gas flowing out of the internal-combustion engine.

In this case, the actual fraction of the returned exhaust gas quantity can be determined by the temperature of the exhaust gas flowing out of the internal-combustion engine. The reason is that the inventors surprisingly found a significant linear dependence of the returned exhaust gas quantity on the exhaust gas temperature. If, in this case, other factors, which influence the temperature of the exhaust gas flowing out of the internal-combustion engine, such as a raised intake air temperature, are recognized by the control of the internal-combustion engine, a very simple determination of the returned exhaust gas quantity is obtained, in which case the relationships may be filed, for example, in a characteristic diagram. By means of the determined actual fraction, an automatic control to the desired fraction will then be easily possible.

A constructive solution for implementing the process according to this alternative solution has an internal-combustion engine, with which at least one fresh air pipe and at least one exhaust pipe are connected, an exhaust gas return valve, and at least one temperature sensor for measuring the temperature of the exhaust gas flowing out of the internal-combustion engine.

Because of the only one required temperature sensor, a particularly simple construction of the system according to the invention is obtained which is resistant to disturbances.

Another alternative solution of the object of the invention involves a process for automatically controlling the fraction of the exhaust gas quantity returned to an internal-combustion engine with respect to the mixture quantity fed on the whole to the internal-combustion engine, which mixture quantity is formed by the returned exhaust gas quantity and a fresh air quantity, wherein an actual fraction of the returned exhaust gas quantity with respect to the mixture quantity fed on the whole to the internal-combustion engine is determined by measurements of the flow rate of the fresh air quantity fed to the internal-combustion engine and of the flow rate of the mixture quantity fed on the whole to the internal-combustion engine, and wherein this actual fraction of the returned exhaust gas quantity is adapted to a predetermined desired fraction.

Also, as the result of the measuring of the fresh air fed to the internal-combustion engine in relationship to the air mass fed on the whole to the internal-combustion engine, which air mass can be computed in a very simple manner from the displacement, a precise determination of the returned exhaust gas quantity can be carried out.

A constructive solution for the implementation of this last mentioned process has an internal-combustion engine, with which at least one fresh air pipe and at least one exhaust pipe are connected, an exhaust gas return valve arranged in the exhaust gas return pipe, at least one air flow rate measuring device for measuring the flow rate of the fresh air quantity fed to the internal-combustion engine provided in the fresh air pipe, at least one pressure sensor for measuring the pressure of the mixture quantity fed on the whole to the internal-combustion engine, and at least one temperature sensor for measuring the temperature of the mixture quantity fed on the whole to the internal-combustion engine.

In the case of this system according to the invention, preferably only components are used which are very easy to handle and ensure reliable measuring results.

Another alternative solution achieving the object of the invention is a process for automatically controlling the fraction of the exhaust gas quantity returned to an internal-combustion engine with respect to the mixture quantity fed on the whole to the internal-combustion engine, which mixture quantity is formed by the returned exhaust gas quantity and a fresh air quantity, wherein the returned exhaust gas quantity is automatically controlled to a predetermined content of nitrogen oxides in the exhaust gas.

As the result of the automatic control of the returned exhaust gas quantity by way of the nitrogen oxide content in the exhaust gas, this value, which should not exceed a certain limit value, can be used directly as an input value for an automatic control.

A constructive solution for implementing this last mentioned includes a said system comprising:

an internal-combustion engine, with which at least one fresh air pipe and at least one exhaust pipe are connected, an exhaust gas return valve arranged in an exhaust gas return pipe, and at least one sensor for measuring the fraction of the nitrogen oxides in the exhaust gas.

Other objects, advantages and novel features of the present invention will become apparent from the following detailed description of the invention when considered in conjunction with the accompanying drawings.

DETAILED DESCRIPTION OF THE DRAWINGS

Figure 1:
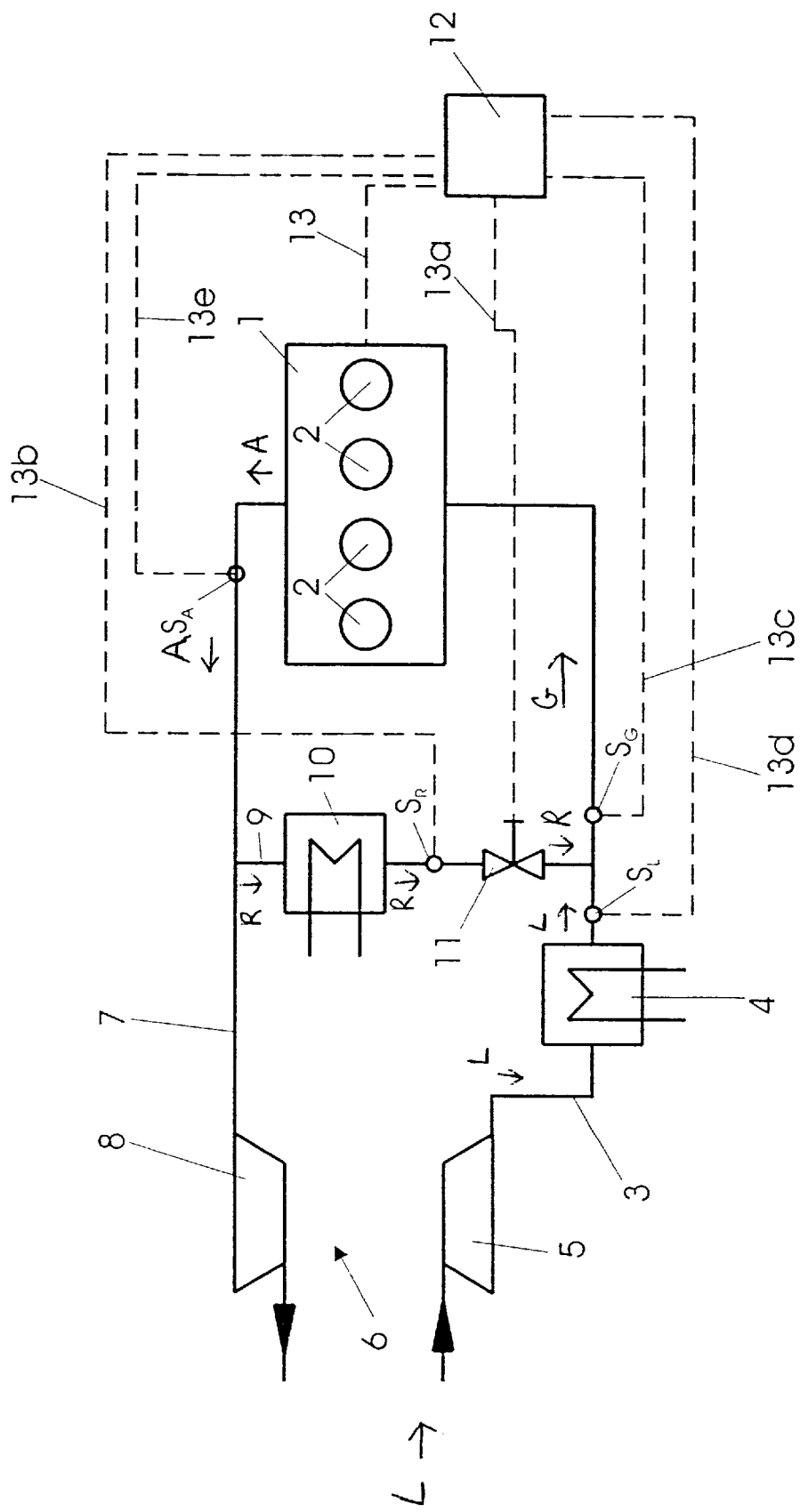
FIG. 1 is a view of a first system for implementing a first process according to the invention.

FIG. 1 is a schematic representation of an internal-combustion engine 1 with several, also schematically illustrated combustion spaces 2. A known intake pipe 3, in which, starting from the internal-combustion engine 1, a charge air cooler 4 as well as a compressor 5 of an exhaust gas turbocharger are situated, leads to the internal-combustion engine 1. Although, in the described embodiment, the internal-combustion engine 1 has the exhaust gas turbocharger 6, this exhaust gas turbocharger 6 is not absolutely necessary. The internal-combustion engine 1 may be a diesel internal-combustion engine as well as an Otto internal-combustion engine 1.

Furthermore, in a manner known per se, an exhaust pipe 7 is connected to the internal-combustion engine 1, through which exhaust pipe 7 exhaust gas A generated in the combustion spaces 2 can leave the internal-combustion engine 1. In the exhaust pipe 7, a turbine 8 is situated which is part of the exhaust gas turbocharger 6 and is mechanically connected with the compressor 5 in a manner known per se which is, however, not shown. An exhaust gas return pipe 9 branches off the exhaust pipe 7 in front of the turbine 8 and, on the opposite side, leads into the intake pipe 3. As the result of the exhaust gas return pipe 9, it is possible in a manner known per se to return to the internal-combustion engine 1 a certain fraction of the exhaust gas A generated in the combustion spaces 2. This fraction is called returned exhaust quantity R. Together with a fresh air quantity L entering into the intake pipe 3, it forms a mixture quantity G fed on the whole to the internal-combustion engine 1.

The exhaust gas return is used for lowering the temperature during the combustion operation in the combustion spaces 2, whereby the nitrogen oxide emissions of the internal-combustion engine 1 are reduced. The returned exhaust gas quantity R considerably influences the air ratio λ, the emitted pollutants as well as the efficiency of the internal-combustion process. In order to, for this reason, be able to automatically control the returned exhaust gas quantity R as precisely as possible, it is necessary to be able to previously or isochronously determine as precisely as possible the fraction of the returned exhaust gas quantity with respect to the entire mixture quantity G. This fraction of the returned exhaust gas quantity R with respect to the mixture quantity G fed on the whole to the internal-combustion engine is also called the exhaust gas return rate AR.

In the exhaust gas return pipe 9, an exhaust gas return cooler 10 as well as an exhaust gas return valve 11 are situated. The control of the exhaust gas return valve 11 takes place by a central electronic control device 12 which is connected by way of a control line 13 with the internal-combustion engine 1. Another control line 13a leads from the control line 12 to the exhaust gas return valve 11.

The internal-combustion engine 1 is operated as follows: By way of the compressor 5, the fresh air quantity L is introduced into the intake pipe 3. In the charge air cooler 4, heat is withdrawn from the fresh air quantity L, and, starting from the mouth of the exhaust gas return pipe 9 into the intake pipe 3, the fresh air quantity L is mixed with the returned exhaust gas quantity R, whereby the mixed quantity G is obtained which is fed on the whole.

This mixed quantity G is fed to the combustion spaces 2 of the internal-combustion engine 1 for the combustion. The exhaust gas A, which forms in a known manner during this combustion in the combustion spaces 2, flows into the exhaust pipe 7. Before the turbine 8 is reached, a partial flow is taken from the exhaust gas A, specifically the returned exhaust gas quantity R. Heat is withdrawn from this returned exhaust gas quantity R in the exhaust gas return cooler 10, after which it flows through the exhaust gas return valve 11 and is admixed to the fresh air quantity L. As the result of the exhaust gas return valve 11, it is possible to change the fraction of the returned exhaust gas quantity R, specifically in that the opening cross-section of the exhaust gas return valve 11 is adjusted by the control device 12 according to a desired fraction $AR_{des}$ of the returned exhaust gas quantity R, and may be filed, for example, in a characteristic diagram.

In order to achieve a reasonable automatic control of the returned exhaust gas quantity R according to the above-mentioned desired fraction $AR_{des}$, it is necessary to determine as precisely as possible the actual fraction $AR_{actual}$ of the returned exhaust gas quantity R. For this purpose, a temperature sensor $S_L$ for measuring the temperature $T_L$ of the fed fresh air quantity L and a temperature sensor $S_G$ for measuring the temperature $T_G$ of the mixed quantity G fed on the whole are provided in the intake pipe 3. In the exhaust gas return pipe 9, a temperature sensor $S_R$ is situated for measuring the temperature $T_R$ of the returned exhaust gas quantity R. In this case, the temperature sensor $S_R$ is arranged between the exhaust gas return cooler 10 and the exhaust gas return valve 11, whereby the temperature $T_R$ of the already cooled returned exhaust gas quantity R is measured.

In the control device 12, which is connected by way of control lines 13b, 13c and 13d with all above-mentioned temperature sensors $S_R$, $S_G$ and $S_L$, the actual fraction $AR_{actual}$ of the returned exhaust gas quantity R is determined from the measured temperatures $T_R$, $T_G$ and $T_L$, and the actual fraction $AR_{actual}$ of the returned exhaust gas quantity R is adapted to the above-mentioned predetermined desired fraction $AR_{des}$. The calculation of the actual fraction $AR_{actual}$ of the returned exhaust gas quantity R takes place according to the formula:

$$AR_{actual} = (T_L - T_G)/(T_L - T_R).$$

This formula is obtained by the conversion of the following equation which is valid by approximation:

$$\dot{m}_G \times T_G = \dot{m}_L \times T_L + \dot{m}_R \times T_R$$

wherein $\dot{m}_G$ = flow rate of the total mixture quantity G $\dot{m}_L$ = flow rate of the fresh air quantity L $\dot{m}_R$ = flow rate of the returned exhaust gas quantity R In addition to the calculation of the exhaust gas return rate AR and of the returned exhaust gas quantity R, the temperature sensors $S_R$ and $S_L$ also permit a monitoring of the function of the charge air cooler 4 and of the exhaust gas return cooler 10, for example, for a self-diagnosis.

Instead of the illustrated version with the temperature sensors $S_R$, $S_G$ and $S_L$, it would also be possible to use only two not shown temperature sensors, which would then measure the differential temperatures $T_L-T_G$ and $T_L-T_R$. The actual fraction $AR_{actual}$ of the returned exhaust gas quantity R could be determined also from the above by means of the above-indicated formula.

If the exhaust gas return rate AR has been determined in this manner, by way of the control device 12, an adaptation of the exhaust gas return rate AR takes place to the predetermined desired fraction $AR_{des}$, specifically also by way of the control line 13a to the exhaust gas return valve 11.

The measurement may be simplified if, by means of the charge air cooler 4 and the exhaust gas return cooler 10, the temperatures $T_L$ and $T_R$ are adjusted to precisely defined values. The reason is that in such a case, only the measuring of the temperature $T_G$ is necessary in order to arrive at the actual fraction $AR_{actual}$ of the returned exhaust gas quantity R, because the other two temperatures $T_L$ and $T_R$ can be assumed to be known. The automatic controlling of the actual fraction $AR_{actual}$ to the desired fraction $AR_{des}$ can take place as explained above.

Another possibility for calculating the actual fraction $AR_{actual}$ of the returned exhaust gas quantity R may be the measuring of the temperature $R_A$ of the total exhaust gas A leaving the combustion spaces 2 of the internal-combustion engine 1.

For this purpose, a temperature sensor $S_A$ is arranged in the exhaust pipe 7, which temperature sensor $S_A$ is connected by means of another control line 13e with the control device 12. A linear dependence was determined here between the actual fraction $AR_{actual}$ of the returned exhaust gas quantity R with respect to the mixture quantity G fed on the whole to the internal-combustion engine 1, thus the exhaust gas return rate AR, and the temperature $T_A$ of the total exhaust gas A in all operating points of the internal-combustion engine 1. In this manner, a characteristic diagram can be established, whereby it is possible to very precisely determine the actual fraction $AR_{actual}$ of the returned exhaust gas quantity R, and, by way of the control device 12, adapt the control line 13a and the exhaust gas return valve 11 correspondingly to the predetermined desired fraction $AR_{des}$.

FIG. 1 therefore illustrates two possibilities, of which either those with the temperature sensors $S_R$, $S_G$ and $S_L$ or those with the temperature sensor $S_A$ are used.

Figure 2:
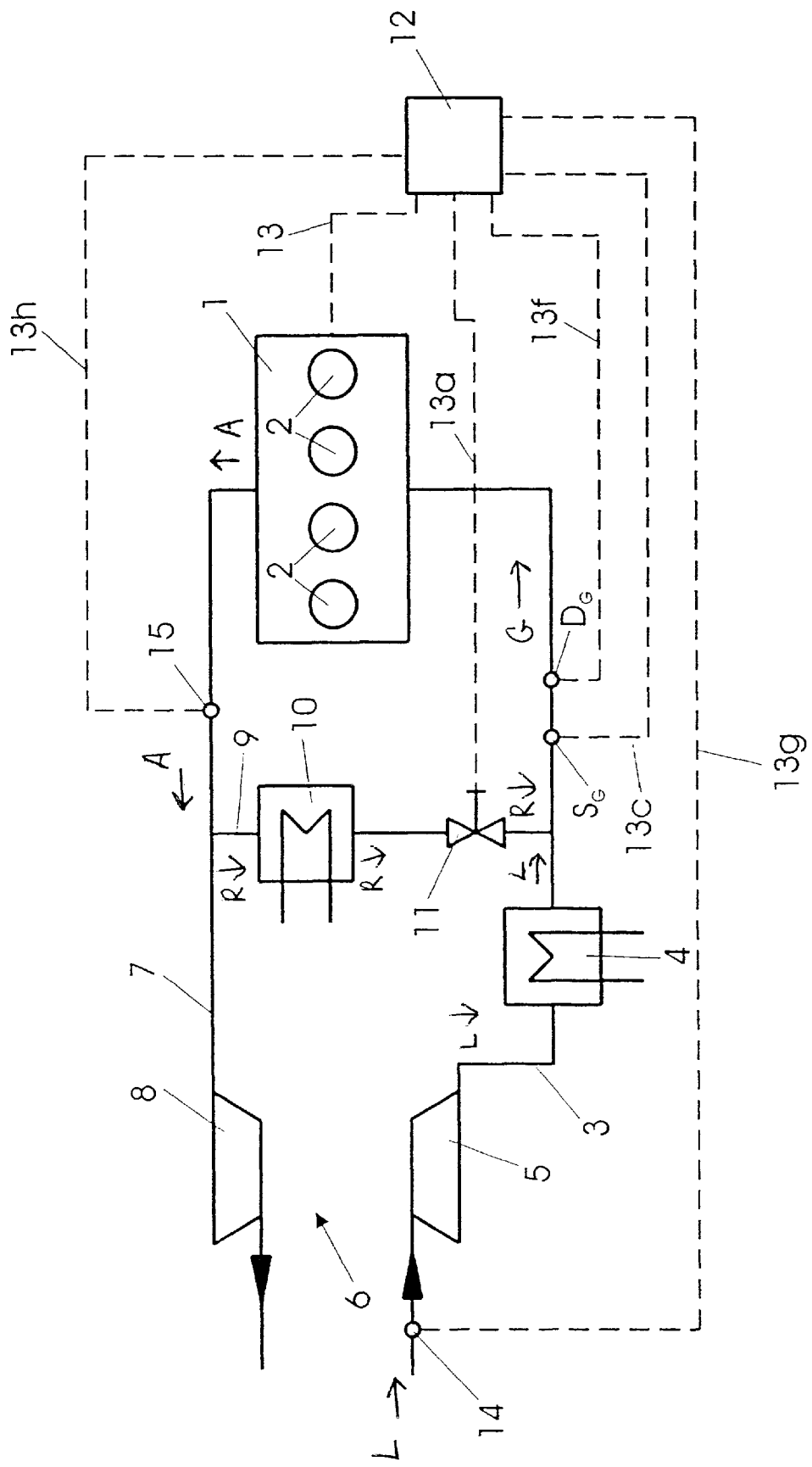
FIG. 2 is a view of a second system for implementing a second process according to the invention.

FIG. 2 shows an alternative possibility for automatically controlling the fraction of the exhaust gas quantity returned to the internal-combustion engine 1, in which case the construction of the internal-combustion engine 1, of the combustion spaces 2, of the intake pipe 3, of the charge air cooler 4, of the exhaust gas turbocharger 6, of the exhaust pipe 7, of the exhaust gas return pipe 9, of the exhaust gas return cooler 10, of the exhaust gas return valve 11 as well as of the control device 12 corresponds to the arrangement illustrated in FIG. 1.

However, in this case, only the temperature sensor $S_G$ for the determination of the temperature $T_G$ of the mixture quantity G fed on the whole to the internal combustion engine 1 is present in the intake pipe 3. Furthermore, a pressure sensor $D_G$ as well as an air flow rate measuring device 14 are provided in the intake pipe 3. In this case, the temperature sensor $S_G$, the pressure sensor $D_G$ as well as the air flow rate measuring device 14 are components which already exist in series constructions of very many internal-combustion engines. An oxygen sensor 15 is situated in the exhaust pipe 7. The temperature sensor $S_G$ is arranged in the flow direction behind the charge air cooler 4 and is connected with the control device 12 by way of the control line 13c. The pressure sensor $D_G$ is also situated in the flow direction behind the charge air cooler 4 and is connected by way of a control line 13f to the control line 12. The air flow rate measuring device is mounted in front of the compressor 5; its connection with the control line 12 is implemented by way of a control line 13g. The oxygen sensor 15 has a control line 13h with the control device 12.

The exhaust gas return rate AR can be computed from the formula:

$$AR = 1 - \dot{m}_L / \dot{m}_G$$

wherein:

$\dot{m}_L$=flow rate of the fresh air quantity L $\dot{m}_G$=flow rate of the total mixture quantity G In this case, the exhaust gas return rate AR is therefore determined from the mixture quantity G fed on the whole to the internal-combustion engine 1 and the fresh air quantity L. For this purpose, the value $m_L$ can be measured by means of the air flow rate measuring device 14, whereas the value $m_G$ can be computed from the ideal gas equation:

$$\dot{m}_G = (\lambda_{a2} \times p_G \times V_H \times n)/(2 \times R_G \times T_G),$$

wherein:

$\lambda_{a2}$=volumetric efficiency of the internal-combustion engine 1

$p_G$=absolute pressure of the total mixture quantity G $V_H$=displacement of the internal-combustion engine 1

$R_G$=gas constant n=rotational speed of the internal-combustion engine 1

$T_G$=absolute temperature of the total mixture quantity G.

The value $\lambda_{a2}$ may be filed in a characteristic diagram, and the absolute pressure $p_G$ is determined by the pressure sensor $D_G$, whereas the displacement $V_H$ and the gas constant $R_G$ are known values. This results in a simple determination of the actual fraction $AR_{actual}$ of the returned exhaust gas quantity R on the internal-combustion engine 1, together with the fed mixture quantity G.

Then, by means of the control device 12, the actual fraction $AR_{actual}$ of the returned exhaust gas quantity R is adapted to the determined desired fraction $AR_{des}$.

In the full-load or transient operation of the internal-combustion engine 1, additionally a monitoring of the combustion air ratio λ would be meaningful in order to, on the one hand, show the maximally possible $NO_x$ reduction there, while avoiding an exceeding of the smoke limit. Such a monitoring can take place, for example, by way of the oxygen sensor 15 illustrated in FIG. 2.

Figure 3:
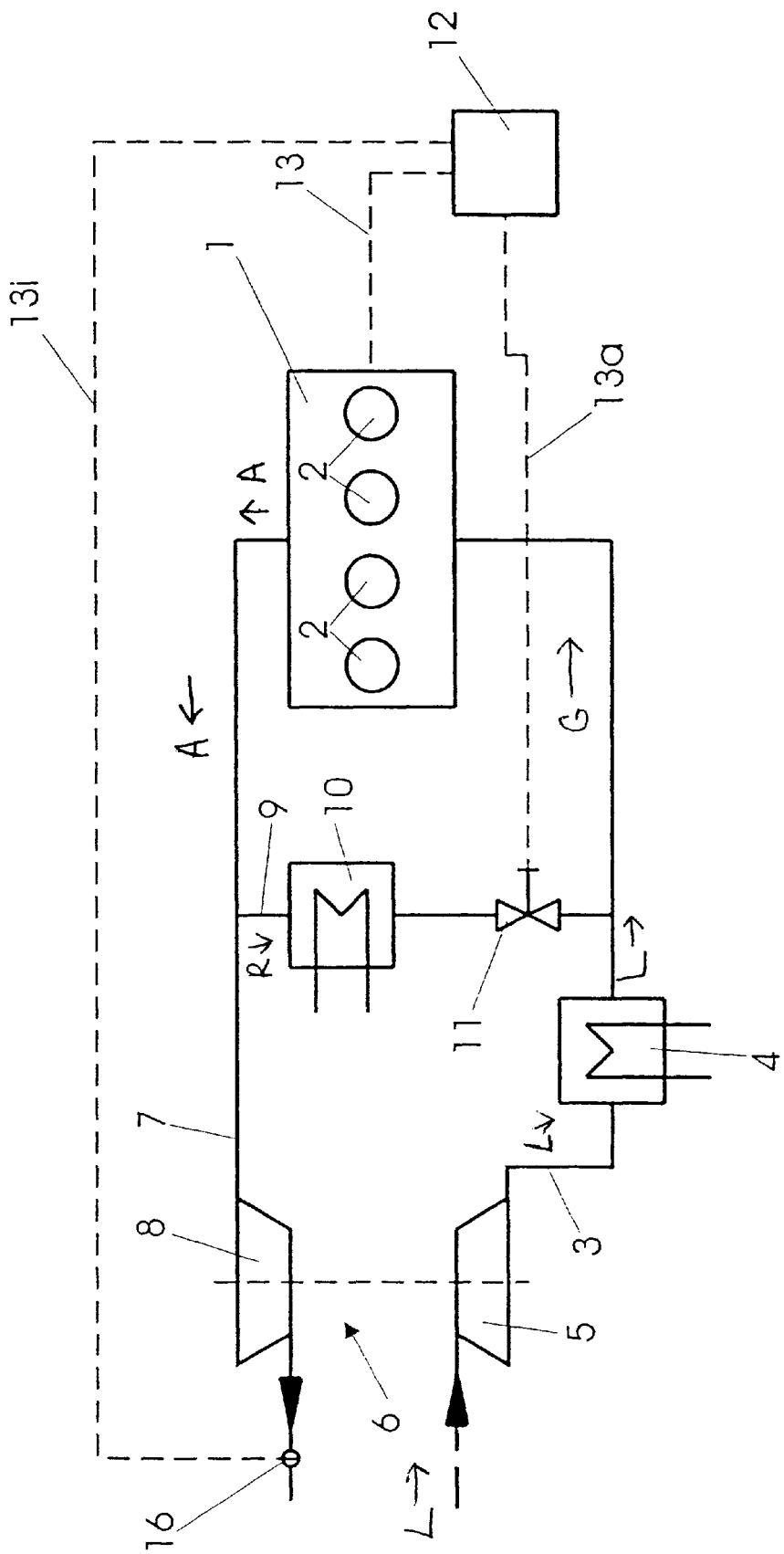
FIG. 3 is a view of a third system for implementing a third process according to the invention.

FIG. 3 illustrates another possibility for automatically controlling the actual fraction $AR_{actual}$ of the exhaust gas quantity R returned to the internal-combustion engine 1, the basic construction being the same as in FIGS. 1 and 2. However, in this case, a nitrogen oxide sensor 16 is arranged in the exhaust pipe 7 behind the turbine 8. The nitrogen oxide sensor 16 determines the actual concentration of nitrogen oxides in the total exhaust gas A and reports it by way of a control line 13i to the control device 12. This control device 12 can then automatically control the opening cross-section of the exhaust gas return valve 11 such that the measured concentration of nitrogen oxides corresponds to a desired value of nitrogen oxides which is stored in a characteristic-diagram form above the parameters of the internal-combustion engine 1, for example, the load number and the rotational speed. The returned exhaust gas quantity R can be automatically controlled by means of this closed-loop control circuit directly to the emission of nitrogen oxides.

Likewise, an automatic controlling to a, for example, legally stipulated nitrogen oxide limit value would be conceivable. In this case, the throughput of nitrogen oxides would have to be computed from the concentration of nitrogen oxides in the exhaust pipe 7, which can be measured by the nitrogen oxide sensor 16, and the multiplication of this value with the sum of a measured or computed air throughput and an applied fuel flow rate, and after the division by the output in the respective operating point, the specific emission of nitrogen oxides can therefore be determined in g/kWh.

In addition to the nitrogen oxide sensor 16, a λ-probe could also be arranged in the exhaust pipe 7, which could limit the exhaust gas return rate AR when there is a falling below a previously determined limit value $\lambda_{min}$ in order to avoid an unacceptable increase of particles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for automatically controlling a fraction of an exhaust gas quantity returned to an internal-combustion engine with respect to a mixture quantity fed on the whole to the internal-combustion engine, which mixture quantity is formed by a returned exhaust gas quantity and a fresh air quantity, wherein the actual fraction ($AR_{actual}$) of the returned exhaust gas quantity with respect to the mixture quantity fed on the whole to the internal-combustion engine is determined by way of a predetermined temperature ($T_L$) of the fed fresh air quantity which is achieved by cooling the fed fresh air quantity to the predetermined temperature ($T_L$), a predetermined temperature ($T_R$) of the returned exhaust gas quantity which is achieved by cooling the returned exhaust gas quantity to the predetermined temperature ($T_R$) and by measuring with a sensor the temperature ($T_G$) of the mixture quantity fed on the whole, and wherein this actual fraction ($AR_{actual}$) of the returned exhaust gas quantity is adapted to a predetermined desired fraction ($AR_{des}$).

2. Process according to claim 1, wherein the actual fraction of the returned exhaust gas quantity with respect to the mixture quantity fed on the whole to the internal-combustion engine is determined according to the formula $AR_{actual}=(T_L-T_G)/(T_L-T_R)$.

3. System for automatically controlling a fraction of an exhaust gas quantity returned to an internal-combustion engine with respect to the mixture quantity fed on the whole to the internal-combustion engine, which mixture quantity is formed by the returned exhaust gas quantity and a fresh air quantity, said system comprising:

an internal-combustion engine, with which at least one fresh air pipe and at least one exhaust pipe are connected, an exhaust gas return valve arranged in an exhaust gas return pipe, a first air cooler for cooling the fed fresh air quantity to a predetermined temperature ($T_L$)

a second air cooler for cooling the returned exhaust gas quality to a predetermined temperature ($T_R$), and a temperature sensor for measuring the temperature ($T_G$) of the mixture quantity fed on the whole, wherein the actual fraction ($AR_{actual}$) of the returned exhaust gas quantity with respect to the mixture quantity fed on the whole to the internal-combustion engine is determined by way of the predetermined temperature ($T_L$) of the fed fresh air quantity, the predetermined temperature ($T_R$) of the returned exhaust gas quantity and the measured temperature ($T_G$) of the mixture quantity fed on the whole, and wherein this actual fraction of the returned exhaust gas quantity is adapted to a predetermined desired fraction.

4. System for the implementation of a process according to claim 3, wherein the actual fraction of the returned exhaust gas quantity with respect to the mixture quantity fed on the whole to the internal-combustion engine is determined according to the formula $AR_{actual}=(T_L-T_G)/(T_L-T_R)$.

5. System for automatically controlling a fraction of an exhaust gas quantity returned to an internal-combustion engine with respect to a mixture quantity fed on the whole to the internal-combustion engine, which mixture quantity is formed by a returned exhaust gas quantity and a fresh air quantity, said system comprising:

an internal-combustion engine, with which at least one fresh air pipe and at least one exhaust pipe are connected, an exhaust gas return valve arranged in an exhaust gas return pipe, a first air cooler for cooling the fed fresh air quantity to a predetermined temperature ($T_L$), a second air cooler for cooling the returned exhaust gas quality to a predetermined temperature ($T_R$), and a temperature sensor for measuring a temperature ($T_G$) of the mixture quality fed on the whole, wherein the actual fraction of the returned exhaust gas quantity with respect to the mixture quantity fed on the whole to the internal-combustion engine is determined by way of the predetermined temperature ($T_L$) of the fed fresh air quantity, the predetermined temperature ($T_R$) of the returned exhaust gas quantity and the measured temperature ($T_G$) of the mixture quantity fed on the whole, and wherein this actual fraction of the returned exhaust gas quantity is adapted to a predetermined desired fraction.

6. System according to claim 5, wherein the actual fraction of the returned exhaust gas quantity with respect to the mixture quantity fed on the whole to the internal-combustion engine is determined according to the formula $AR_{actual}=(T_L-T_G)/(T_L-T_R)$.

7. Process for automatically controlling the fraction of exhaust gas quantity returned to an internal-combustion engine with respect to the mixture quantity fed on the whole to the internal-combustion engine, which mixture quantity is formed by the returned exhaust gas quantity and a fresh air quantity, wherein an actual fraction ($AR_{actual}$) of the returned exhaust gas quantity (R) with respect to the mixture quantity (G) fed on the whole to the internal-combustion engine (1) is determined by way of at least one sensor from at least one measurement of a temperature ($T_A$) of the exhaust gas (A) flowing out of the internal-combustion engine (1), and wherein this actual fraction ($AR_{actual}$) of the returned exhaust gas quantity (4) is adapted to a predetermined desired fraction ($AR_{des}$).

8. System for automatically controlling a fraction of an exhaust gas quantity returned to an internal-combustion engine with respect to a mixture quantity fed on the whole to the internal-combustion engine, which mixture quantity is formed by a returned exhaust gas quantity and a fresh air quantity, said system comprising:

an internal-combustion engine, with which at least one fresh air pipe and at least one exhaust pipe are connected, an exhaust gas return valve, and at least one temperature sensor for measuring the temperature of the exhaust gas flowing out of the internal-combustion engine, wherein an actual fraction of the returned exhaust gas quantity with respect to the mixture quantity fed on the whole to the internal-combustion engine is determined by way of at least one sensor from at least one measurement of the temperature of the exhaust gas flowing out of the internal-combustion engine, and wherein this actual fraction of the returned exhaust gas quantity is adapted to a predetermined desired fraction.

9. System according to claim 8, wherein the temperature sensor is arranged downstream of combustion spaces between the internal-combustion engine and an exhaust gas return cooler.

10. System according to claim 9, wherein the temperature sensor is arranged downstream of combustion spaces between the internal-combustion engine and an exhaust gas turbocharger.

11. A process for automatically controlling a fraction of an exhaust gas quantity returned to an internal-combustion engine with respect to a mixture quantity fed on the whole to the internal-combustion engine, whereby the mixture quantity is formed by the returned exhaust gas quantity and a fresh air quantity, said process comprising:

cooling the fed fresh air quantity to a predetermined temperature ($T_L$);

cooling the returned exhaust gas quantity to a predetermined temperature ($T_R$);

measuring a temperature ($T_G$) of the mixture quantity (G) fed on the whole;

determining an actual fraction ($AR_{actual}$) of the returned exhaust gas quantity with respect to the mixture quantity fed on the whole to the internal-combustion engine as a function of the predetermined temperature ($T_L$) of the fed fresh air quantity, the predetermined temperature ($T_R$) of the returned exhaust gas quantity and the measured temperature of the mixture quantity ($T_G$) fed on the whole; and adapting the actual fraction ($AR_{actual}$) of the returned exhaust gas quantity to a predetermined desired fraction ($AR_{desired}$).

* * * * *